United States Patent
Drissi et al.

(10) Patent No.: US 8,538,915 B2
(45) Date of Patent: Sep. 17, 2013

(54) UNIFIED NUMERICAL AND SEMANTIC ANALYTICS SYSTEM FOR DECISION SUPPORT

(75) Inventors: Youssef Drissi, Ossining, NY (US); Tyrone W. Grandison, San Jose, CA (US); Colin G. Harrison, Brookfield, CT (US); Kaan K. Katircioglu, Yorktown Heights, NY (US); Jurij R. Paraszczak, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/834,615

(22) Filed: Jul. 12, 2010

(65) Prior Publication Data

US 2012/0011139 A1 Jan. 12, 2012

(51) Int. Cl.
G06F 7/00 (2006.01)
G06F 17/30 (2006.01)

(52) U.S. Cl.
USPC .......................................... 707/603; 707/765

(58) Field of Classification Search
USPC .......................... 707/603, 710, 766, 768, 765
See application file for complete search history.

(56) References Cited

U.S. PATENT DOCUMENTS

| | | | |
|---|---|---|---|
| 5,774,425 A | 6/1998 | Ivanov et al. | |
| 5,774,525 A | 6/1998 | Kanevsky et al. | |
| 6,173,279 B1 * | 1/2001 | Levin et al. | 704/9 |
| 6,665,666 B1 * | 12/2003 | Brown et al. | 1/1 |
| 6,847,966 B1 * | 1/2005 | Sommer et al. | 707/739 |
| 2004/0194150 A1 * | 9/2004 | Banker | 725/135 |
| 2006/0184482 A1 * | 8/2006 | Flinn et al. | 706/45 |
| 2006/0217818 A1 | 9/2006 | Fujiwara | |
| 2006/0277465 A1 | 12/2006 | Pandit et al. | |
| 2007/0073651 A1 * | 3/2007 | Imielinski | 707/3 |
| 2007/0094219 A1 * | 4/2007 | Kipersztok | 706/52 |
| 2007/0130186 A1 * | 6/2007 | Ramsey et al. | 707/101 |
| 2007/0207449 A1 | 9/2007 | Feierstein | |
| 2008/0010259 A1 * | 1/2008 | Feng et al. | 707/3 |
| 2008/0154833 A1 | 6/2008 | Jessus et al. | |
| 2009/0089282 A1 * | 4/2009 | Qi et al. | 707/5 |

OTHER PUBLICATIONS

Lucko, G., et al., "Harnessing the Power of Simulation in the Project Management/Decision Support Aspects of the Construction Industry," Proceedings of the 2008 Winter Simulation Conference, 978-1-4244-2708-6/08, copyright 2008 IEEE. pp. 2479-2487.
Jain, S., et al., "Designing Incentives for Online Question and Answer Forums," EC'09, Jul. 6-10, 2009, Stanford, California, copyright 2009 ASCM978-1-60558-458-4/09/07. pp. 129-138.
Breaux, T., et al., "Semantic Parameterization: A Process for Modeling Domain Descriptions," ACM Transactions on Software Engineering and Methodologies, vol. V., No. N. pp. 1-44, Nov. 2008.
Li, W. et al., "Extracting Exact Answers to Questions Based on Structural Links," Proceeding MultiSumQ Proceedings of the 2002 Conference on Multilingual Summarization and Question Answering, vol. 19, pp. 1-3, 8, Association for Computational Linquistics, Stroudsburg, PA, USA copyright 2002. This Reference Was Published in 2002 Earlier Than the Effective U.S. Filing Date or Foreign Priority Date.

* cited by examiner

Primary Examiner — James E Richardson
(74) Attorney, Agent, or Firm — Jeffrey N. Giunta; Fleit Gibbons Gutman Bongini & Bianco PL (57) ABSTRACT

A system and method for responding to a query. An original query is received. A first semantic query and a second semantic query are extracted from the information of the original query. The first semantic query is transformed, based upon semantic analysis, into a numeric model query. The second semantic query is submitted to a semantic analyzer and the numeric model query is submitted to a numeric model analyzer. A response for the second semantic query and a response for the numeric model query are integrated into an answer for the original query.

20 Claims, 4 Drawing Sheets

UNIFIED NUMERICAL AND SEMANTIC ANALYTICS SYSTEM FOR DECISION SUPPORT

FIELD OF THE INVENTION

The present invention generally relates to automated data analysis and more particularly to systems and methods to iteratively improve query responses.

BACKGROUND OF THE INVENTION

Efficiently and effectively analyzing the vast amount of data currently available for automated analysis, such as is available from many diverse automated information systems, is often difficult. The field of Information Analytics, or Data Mining, is developing techniques to more efficiently handle the vast amounts of currently available data and also the ever increasing amounts of data being collected daily. Effective analysis of existing data is applicable to, for example, retailers to help optimize supply chains and to help predict the needs of customers. Various data collection and analysis entities process very large volumes of email, conversations, and other types of data. Healthcare researchers process large silos of health data to discover medication and adverse event correlations. Environmental scientists can leverage data mining algorithms to significantly reduce the time it takes to verify hypotheses.

However, the various problems that can be solved through data analyses are not all amenable to the same type of data analysis. Answers to some problems are better obtained by numeric analysis, and some are better obtained through semantic analysis of unstructured data.

Therefore, the efficiently of obtaining results to a posed question is limited by a lack of uniformity of analyses to be applied.

SUMMARY OF THE INVENTION

In one embodiment, a method for responding to a query includes performing the following with a processor. An original query is accepted. A first semantic query and a second semantic query are extracted from the original query. The first semantic query is transformed, based upon semantic analysis, into a numeric model query. The second semantic query is submitted to a semantic analyzer. The numeric model query is submitted to a numeric model analyzer. A response for the second semantic query and a response for the numeric model query are integrated into an answer for the original query.

In another embodiment, a system for responding to a query includes a memory and a processor communicatively coupled to the memory. The processor includes an instruction processor that accepts an original query and extracts a first semantic query and a second semantic query from the original query. The instruction processor further transforms, based upon semantic analysis, the first semantic query into a numeric model query. The instruction processor also submits the second semantic query to a semantic analyzer and submits the numeric model query to a numeric model analyzer. The instruction processor additionally integrates, into an answer for the original query, a response for the second semantic query and a response for the numeric model query.

In another embodiment, a computer program product for responding to a query includes a storage medium readable by a processing circuit and storing instructions for execution by the processing circuit for performing a method. The method includes receiving an original query and extracting a first semantic query and a second semantic query from the original query. The method also includes transforming, based upon semantic analysis, the first semantic query into a numeric model query. The method additionally includes submitting the second semantic query to a semantic analyzer and submitting the numeric model query to a numeric model analyzer. The method also includes integrating, into an answer for the original query, a response for the second semantic query and a response for the numeric model query.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The systems and method described below provide enhanced responses to user questions by analyzing a user's questions with a combination of both semantic analysis and numeric analysis. Semantic analysis and numeric analysis are combined to produce an enhanced response to a user's question. The system and methods described below utilize a customizable combination of semantic and numerical analysis techniques to answer rich, complex user's questions. Examples of questions that benefit from the combination of semantic analysis and numeric analysis include:

1. How do I enhance and optimize my ROI models for the Carbon management and supply chain in the city by factoring-in both numerical data and the input of the consumers and the city residents?

2. What does the city government need to do to improve the residents satisfaction with regards to X?

3. How do I allocate my community budget to maximize the overall benefit?

4. What is the rating of the management with regards to feature/phenomenon Y compared to other community managers in the region?

Figure 1:
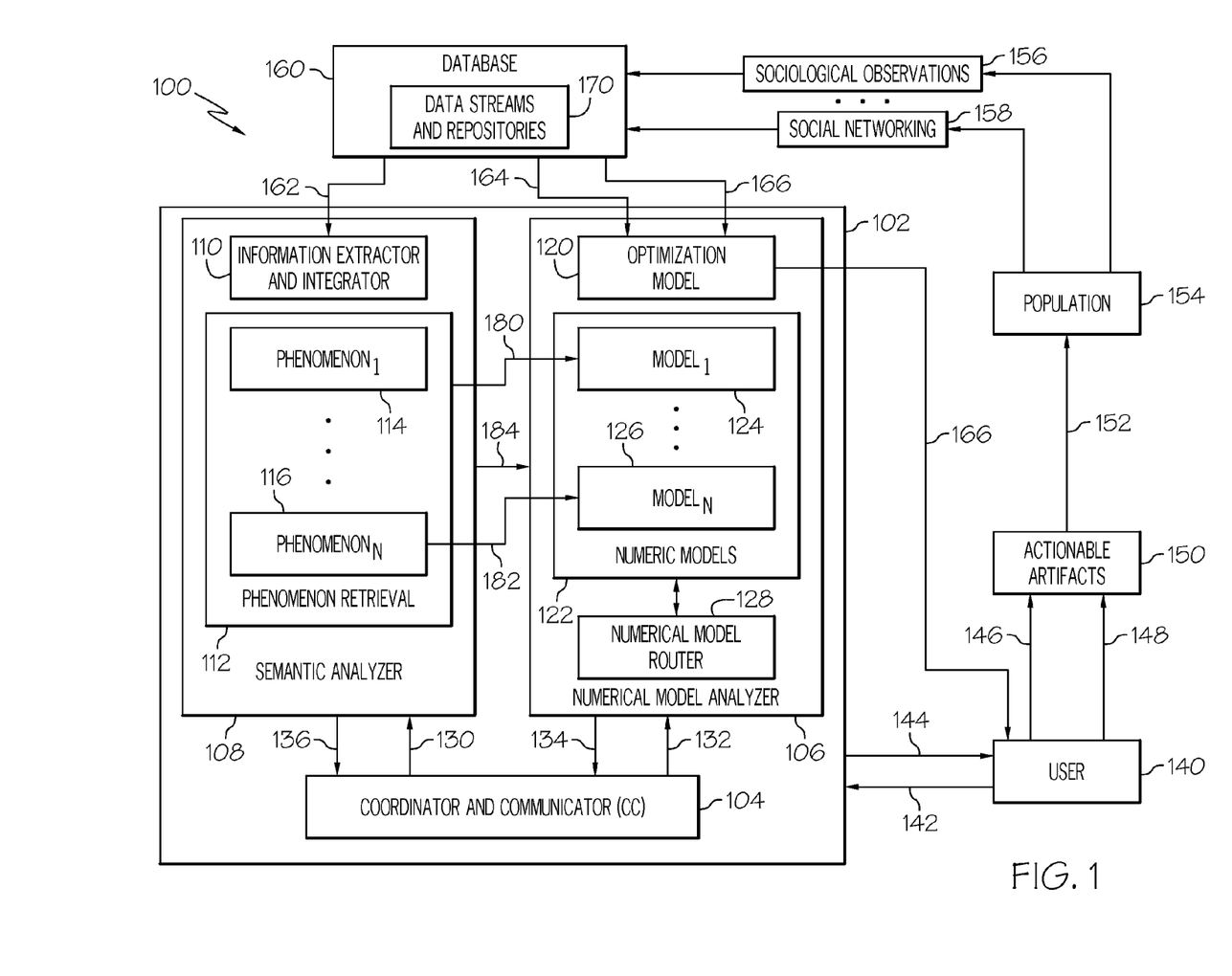
FIG. 1 illustrates an operating environment for a unified numerical and semantic analytics system in accordance with one embodiment.

FIG. 1 illustrates an operating environment for a unified numerical and semantic analytics system 100. The operating environment for the unified numerical and semantic analytics system 100 includes an analytical system 102 with an interface for a user 140. User 140 is able to submit a query 142 to the analytical system 102 and receives a user response 144 from the analytical system 102. Queries 142 submitted by user 140 in one example are natural language questions. Analytics system 102 processes the natural language question in query 142 and provides an answer or user response 144 to the user 140.

In one example, the user 140 is a policy maker who submits questions to the analytical system 102 regarding suggestions for public policy decisions. The user 140 then receives responses 144 with answers to those questions from the analytical system 102. The responses from the analytical system 102 are able to include recommend actions for the user 140 to take or include data upon which the user is able to decide which actions to take. The analytical system 102 includes semantic analysis and numeric model analysis components to interpret received questions and produce responses. The operation of the analytical system 102 in determining answers to the user's questions is discussed in further detail below.

The user 140, based upon the responses and possible recommended actions received from the analytical system 102, takes a first action 146 and a second action 148. The first action 146 and second action 148 creates actionable artifacts 150 with regards to a population 154. Examples of actionable artifacts include, for example, the effects upon the population such as a decrease in resource consumption.

In the example of a public policy maker, the actions taken by the user 140 produces effects 152 on a public population 154. In one example, the public policy maker is a city planner and the actions taken by the user 140 have impacts on the public population of a city. The effects on the public population 154 cause impacts to which the public population 154 responds in various ways. The people are able to directly express their opinion of the public planner's actions and those action's impacts through social networking 158 facilities, such as blogs and other social networking devices. Sociological observations 156 are also made on the public population, such as data reflecting vehicle traffic patterns, retail consumption in various types of stores or geographical areas, or general data obtained through, for example, newspaper editorials. Many other types of data reflecting the opinions of the public population are able to be collected through various means known to practitioners of ordinary skill in the art in light of the present discussion.

The data reflecting the impacts of the user's actions is then collected into database 160 that collects and stores data streams and repositories 170. Data reflecting the impacts of the user's actions is then analyzed by an optimization model 120 within the analytical system 102. The optimization model 120 measures and characterizes the impact of the actions 146 and 148 by analyzing their corresponding metrics and semantic information obtained by analysis of the data streams and repositories 170 collected in the database 160. Semantic analysis is performed on the unstructured data collected in the database 160 to extract relevant information, such as information related to an impact caused by a user's actions. The semantic analysis is able, in some cases, to extract quantitative metric data from the unstructured information contained within the data streams and repositories 170 collected in the database 160. Extracted metric data and other data produced by the semantic analysis of the data streams and repositories 170 collected in the database 160 are used to update, modify, or replace data within the models of the analytical system 102.

A relational model within the optimization model 120 estimates the quantitative relation between the user's actions and the observed metrics related to the impact caused by the user's action. In one example, the measurements and characterizations of the optimization model 120 are used to refine, adjust, or even replace models used within the analytical system 102. For example, mathematical models within the numerical models 122 are able to be modified, augmented or replaced based upon the measurements and characterizations of the data reflecting the affects of the user actions.

Data reflecting the impacts of the user's actions retrieved from the data streams and repositories 170 are analyzed through semantic analysis. Feedback and further recommendations 166 based on the analysis of data reflecting the user's actions are then provided to the user 140. The unified numerical and semantic analytics system 100 implements an optimization loop model that relates the actions 146, 148 taken by user 140 to the changing values of metrics determined by analysis of the content of data streams and repositories 170 so that every time an action is taken based upon recommendations of the analytics system 102, there is better data available to estimate the impacts of those actions.

Turning now to a more detailed description of the analytics system 102, the analytics system 102 includes three primary components: a coordinator and communicator component 104, a semantic analyzer 108 and a numerical model analyzer 106. The coordinator and communicator component 104 receives queries 142 from the user 140 and analyzes those questions to extract semantic queries to provide to the semantic analyzer 108 and, if the format of the question allows, numeric model queries to submit to the numeric model analyzer 106. In one example, semantic queries that include a quantitative action term are transformed into numeric model queries.

In one example, semantic analysis is applied to the natural language user question contained within the received query 142 in order to detect keywords and concepts that are designated as quantitative action terms that can be transformed into queries performed by numerical models. Words such as "Optimize", "Compute", and "Calculate", that are contained in the natural language question are used to identify portions of the natural language question that are suitable to be transformed into a numeric model query. Identification of semantic queries within the natural language user question is able to be performed based on a set of mapping rules. In some examples, a large set of mapping rules are developed to effectively identify semantic queries within a user's natural language question that are suitable to be transformed into one or more numeric model queries. These mapping rules can be illustrated by a simple example such as:

If the natural language question contains the "enhance" keyword, then select the "optimization" numeric model If the metric associated with the "enhance" keyword as is specified in the natural language question includes the term "ROI", then the "ROI optimization" numeric model subset of the optimization numeric model is selected.

The semantic analyzer 108 processes requests from the Coordinator and Communicator component 104 by performing an unstructured data analysis based upon phenomena stored in a phenomenon retrieval component 112. The phenomenon retrieval component 112 stores a number of phenomena that were identified, extracted, and stored by an information extractor and integrator 110 of the semantic analyzer 108. The information extractor and integrator 110 extracts data and information from a number of structured and unstructured data streams and repositories 170 stored in a database 160. An information extractor and integrator 110 operates in conjunction with a phenomenon retrieval component 112 identifies phenomena, such as phenomenon$_1$ 114 and phenomenon$_n$ 116 by a number of suitable techniques.

The semantic analyzer 108 of one example applies various models including dictionary lookup models, grammar-based pattern matching models, and statistical natural language processing models. In general, the semantic analyzer 108 is able to include different methods that use Natural Language Processing for Information Extraction, Information retrieval, Entity and Relation Detection, Search, and the like.

The numerical model analyzer 106 includes and maintains a number of mathematical models, such as model$_1$ 124 and model$_n$ 126, within numeric models 122. When a numerical model analyzer 106 receives a request from the Coordinator and Communicator component 104, the numerical model router 128 selects a mathematical model within the numeric models 122 to use based on the received numerical model analyzer request 132.

Based upon the numerical model analyzer request 132, the numeric models may identify additional information needed by a numeric model that is not available directly as numerical data. In such instances, additional numerical data for the selected numeric models is able to be obtained by semantic analysis of unstructured information, such as information describing consumer satisfaction data, demand for a certain type of product, and the like. The unstructured data is able to be received in various forms, such as text, emails, and the like.

Additional information needed by a mathematical model is identified in a number of ways. In one example, each numerical model, such as a numeric model to calculate expected revenue for next year, has a number of inputs. Examples of inputs for an expected revenue model include historical data for revenues, costs, expenses, and the current number of customer complaints on the web. If the input data required by a numeric model is not available, then a corresponding data extractor operates to extract the data, such as from the data streams and repositories 170. For example, if data related to the "number of customer complaints on the web" is not currently available, then a semantic analysis is performed that: a) Crawls the web (either all of the web or only selected web sites), and b) detects the presence of customer complaints about the target product or service using an appropriate semantic analyzer. An example of such a semantic analyzer includes a complain detector that detect text that represents a complaint about a certain product xyz such as " . . . The product xyz didn't work for me . . . ."

Examples of numeric models incorporated into one example of a numeric model analyzer 106 include a numeric model analyzer for Revenue Planning that extrapolates historical data, such as historic revenue, costs, and expenses, to support future year planning. Future year planning can include setting reasonable revenue targets and expectations for the upcoming year. Another numeric model included a numeric model analyzer is an inventory optimization model that computes the optimal inventory levels in a supply chain given historic supply and demand data. Optimizing inventory levels is often important because having too much inventory might result in higher costs, and having too little might result in unsatisfied customer orders.

In order to facilitate the derivation of numerical data from unstructured data to support the numerical models 122, one or more mathematical models within the numeric models 122 are able to be associated with zero or more phenomena within the phenomenon retrieval component 112 in the Semantic Analyzer 108. The extracted semantic information is transformed to the right format required by the numerical model and provided as input to the model. In an example of a budgetary analysis application, the extracted semantic information is transformed into a format suitable for budget allocation analytics. The phenomenon retrieval component 112 and the numerical models 122 are able to be standard contemporary models or tailor-made models based upon various techniques.

The input request or query 142 provided to the analytical system 102 from a user 140 include unstructured information in, for example, natural language questions. Examples of natural language questions contained in a query 142 include: "What do I need to do to improve resident satisfaction with regards to X?" "How do I allocate my community events budget to maximize overall benefit?" "How do I rate with regards to feature/phenomenon Y compared to other community managers in the region?"

The Coordinator and Communicator component 104 receives the query 142 from the user 140. The Coordinator and Communicator component 104 then analyzes the received natural language question to determine which analyzer component(s) to use to process the questions and in what order those analyzers are to be used. Based upon the analysis of the natural language question in the query 142, the Coordinator and Communicator component 104 submits suitably formatted requests 130 and 132 to one or both of the semantic analyzer 108 and to the numeric model analyzer 106, respectively. In one example, a semantic analysis is performed on the unstructured information of the question to extract structured data elements upon which a numeric model analysis can be performed.

Based upon the contents of the request 130 to the semantic analyzer 108, the semantic analyzer 108 is able to extract structured data elements from the unstructured information in the request. An example of a structured data element extracted from the unstructured information of the user's natural language question include the above described extracted numeric model query that is identified and extracted based upon detected keywords in the natural language query. Based upon the extracted structural data, the semantic analyzer 108 is able to create and properly format numerical model analyzer requests 184 to send to the numerical model analyzer 106 in order to determine numerical data based upon unstructured textual questions. Semantic analysis of the unstructured data is also able to determine which mathematical model should be used to process the numerical model analyzer requests 184.

After submitting the requests to one or more of the numerical model analyzer 106 and the Semantic Analyzer 108, the Coordinator and Communicator component 104 receives responses 134, and 136 from these analyzers. The Coordinator and Communicator component 104 combines, if required, the responses received from the analyzers into an answer that is understandable by the user 140. The analytics system 102 then delivers that answer as a user response 144 that is received by the user 140.

The Coordinator and Communicator component 104 combines semantic analysis results and numeric model analysis results in a variety of ways. For example, a question regarding expected revenue for the next year is able to combine the quantitative revenue estimate with semantic analysis that reflects consumer satisfaction or dissatisfaction with the products upon that revenue is based.

Once a user takes action, the optimization model 120 analyzes feedback gathered into the data streams and repositories 170. An example of analyzing feedback information in the data streams and repositories 170 includes a user making decisions associated with providing customer service. After the decision is made, the data streams and repositories 170 stored in the database 160 include responses to customer satisfaction. These customer satisfaction responses are semantically processed to extract mathematical models of customer satisfaction. Semantic processing is able to include, for example, processing according to a natural language processing (NLP) model. These mathematical models of customer satisfaction are then able to be updated in the numeric models 122.

Figure 2:
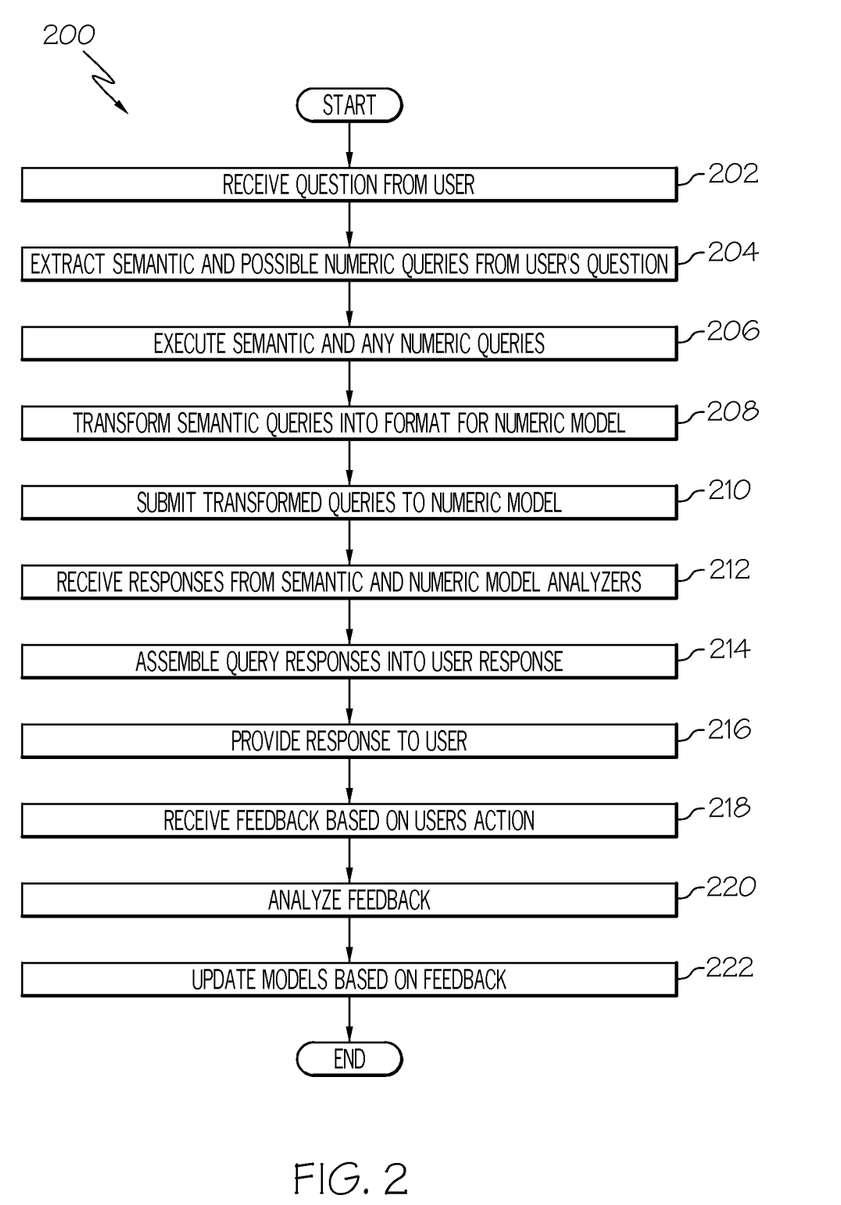
FIG. 2 illustrates an analytical system process as is performed by the analytical system of FIG. 1.

FIG. 2 illustrates an analytical system process 200 as is performed by the analytical system 102 of FIG. 1. The analytical system process 200 begins by receiving, at 202, a query 142 from the user 140. The analytical system process 200 continues by extracting, at 204, semantic and possible additional numeric model query or queries from the received user's question. The analytical system process 200 continues by executing, at 206, the semantic and numeric model queries. In one example, semantic queries are processed by semantic analyzer 108 and the numeric model queries are processed by the numeric model analyzer 106.

The analytical system process 200 of one example operates by transforming, at 208, semantic queries into a format for processing by the numeric model analyzer 106. One example of this transformation is processing natural language text to generate queries suitable for processing by a numeric model analyzer. The analytical system process 200 submits, at 210, the transformed queries to the numeric model analyzer.

The analytical system process 200 continues by receiving, at 212, responses from the semantic analyzer 108 and the numerical model analyzer 106. These responses are received in one example by the coordinator and communicator component 104. The coordinator and communicator component 104 in this example assembles, at 214, the received responses into a user response 144. The user response 144 is then provided, at 216, to the user 140.

After a user 140 receives the user response 144, the user 140 is able to take an action (not shown in FIG. 2). The processing proceeds to receive, at 218, feedback based on the user's action. As described above with regards to the optimization model 120, the feedback is able to be derived by analysis of information provided by a population affected by the decision. The feedback is then analyzed, at 220. Analysis of the feedback is able to include semantic analysis of unstructured information, as is described above. The models used by the analytical system are then updated, at 222, based on the analysis of the feedback. The analytical system process 200 then end.

Figure 3:
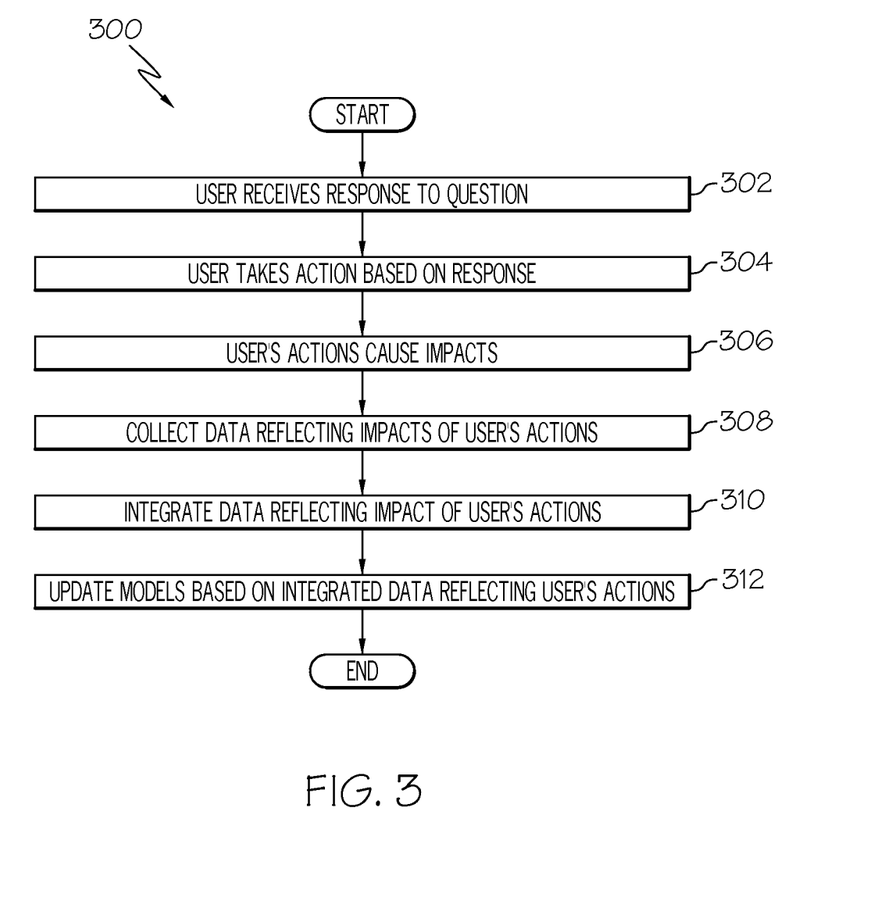
FIG. 3 illustrates an analytical system recommendation and impact analysis in accordance with one embodiment.

FIG. 3 illustrates an analytical system recommendation and impact analysis 300. The analytical system recommendation and impact analysis 300 is one example of a process by which a user, such as a public policy maker, utilizes the analytics system 102, described above, to receive recommendations for actions and in which the analytics system 102 monitors impacts of those actions as feedback to update models used by the analytics system 102.

The analytical system recommendation and impact analysis 300 begins by a user's receiving, at 302, a response to a question submitted by user 140 to the analytics system 102. The user 140 takes action, at 304, based on that response.

The actions taken by the user cause, at 306, impacts. Examples of actions and impacts are described in relation to a public policy maker taking actions and causing impacts on a population. Data is collected, at 308, that reflect the impacts of the user's actions. In the case of a public policy decision, the collected data is able to include blog postings by the population, sociological observations, letters and news articles concerning the impacts of the user's actions, and the like.

The analytical system recommendation and impact analysis 300 operates to integrate, at 310, data reflecting the impact of the user's actions. In one example, the collected unstructured data is semantically analyzed to determine metrics and other semantic information reflecting the impact of the user's actions.

The analytical system recommendation and impact analysis 300 updates, at 312, models based on the integrated data reflecting the user's actions. In one example, the models are updated based on a relational model within the optimization model 120 that estimates the quantitative relation between the user's actions and the observed metrics reflecting the impact of the user's actions. Updating the models in one example is used to provide feedback and adjustments recommendations to the user 140 based on the impacts of the user's previous decisions. Iteratively using the analytics system 102 to support decisions and monitor the impacts of those decisions to update the models is used to improve the user's decisions. In other words, an optimization loop model uses the above relational model so that every time the optimization is run, there is better data available to estimate the impacts of recommended actions.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
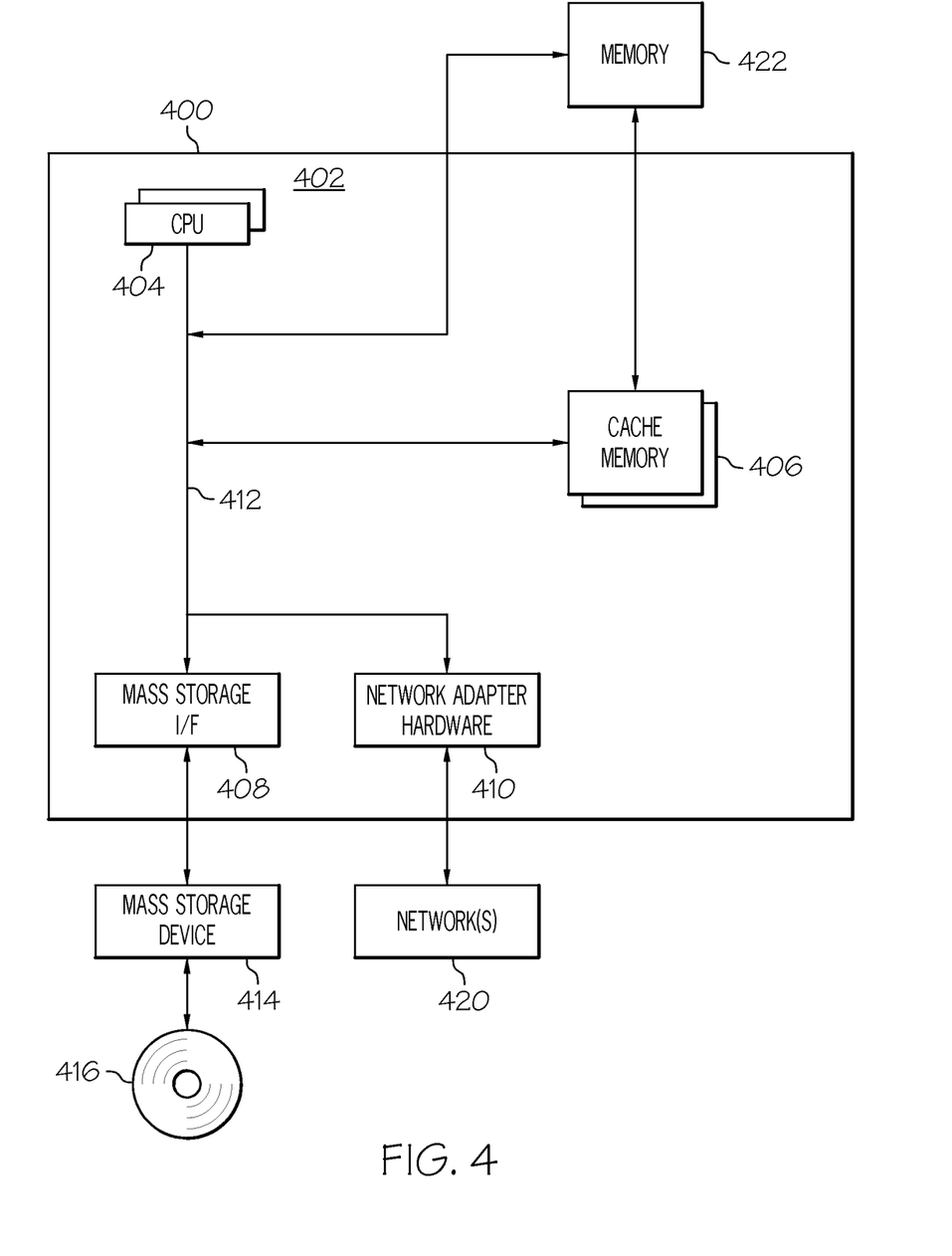
FIG. 4 is a block diagram illustrating an information processing system according to one embodiment of the present invention.

Referring now to FIG. 4, which is a block diagram illustrating an information processing system 400 that can be utilized in conjunction with analytical system 102 discussed above with respect to FIG. 1. The information processing system 400 is based upon a suitably configured processing system adapted to implement one or more embodiments of the present invention. Similarly, any suitably configured processing system can be used as the information processing system 400 by embodiments of the present invention.

The information processing system 400 includes a computer 402. The computer 402 has one or more instruction processor(s) 404 that are connected to a cache memory 406, memory 422, mass storage interface 408, and network adapter hardware 410. A system bus 412 interconnects these system components.

The mass storage interface 408 is used to connect mass storage devices, such as data storage device 414, to the information processing system 400. One specific type of data storage device is an optical drive such as a CD/DVD drive, which may be used to store data to and read data from a computer readable medium or storage product such as (but not limited to) a CD/DVD 416. Another type of data storage device is a data storage device configured to support, for example, NTFS type file system operations.

An operating system (not shown) included in the memory 422 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 400. The network adapter hardware 410 in one embodiment provides network communications interfaces to one or more networks 420. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for responding to a query, the method comprising:
    performing the following with a processor:
        receiving an original query for information related to an action affecting a public population;

extracting a first semantic query and a second semantic query from the original query, the first semantic query comprising a quantitative action term;

transforming, based upon semantic analysis of the quantitative action term, the first semantic query into a numeric model query;

determining semantic response data for the second semantic query based upon semantic analysis of unstructured data sources that comprise unstructured data pertaining to behaviors of the public population to determine response information for the original query;

determining numeric response data for the numeric model query based upon at least one mathematical model incorporating numeric data associated with the public population to determine response information for the original query; and integrating the semantic response data and the numeric response data into an answer for the original query.

2. The method of claim 1, further comprising accepting the original query from a user as a natural language question.

3. The method of claim 1, further comprising:

extracting an additional numeric model query from the original query; and determining additional numeric response data for the additional numeric model query based upon at least one mathematical model incorporating numeric data associated with the public population, wherein the integrating further comprising integrating the additional numeric response data into the answer for the original query.

4. The method of claim 1, wherein the determining numeric response data comprises:

identifying additional data for the at least one mathematical model to use to respond to the numeric model query;

determining the additional data based upon semantic analysis of the unstructured data sources that comprise unstructured data pertaining to behaviors of the public population; and incorporating the additional data into the at least one mathematical model, wherein the numeric response data is further based upon the at least one mathematical model incorporating the additional data.

5. The method of claim 1, further comprising:

providing the answer to a user;

determining, subsequent to providing the answer to the user and subsequent to the user taking the action, semantic reaction data based upon semantic analysis of the unstructured data sources that comprise unstructured data pertaining to behaviors of the public population to determine a reaction of the public population to the action; and updating, based on the semantic reaction data, at least one of the at least one mathematical model and a model used for semantic analysis of the unstructured data sources.

6. The method of claim 5, wherein the unstructured data sources comprise at least one of at least one blog, at least one letter, and at least one data stream describing behaviors of the public population.

7. The method of claim 1, further comprising:

maintaining a repository storing at least data obtained from the unstructured data sources, and wherein the semantic analysis comprises performing a semantic analysis of the unstructured data stored in the repository.

8. The method of claim 7, wherein the maintaining the repository comprises receiving, from a plurality of sources, unstructured data provided by members of the public population, the unstructured data reflecting behaviors of the public population.

9. A system for responding to a query, the system comprising:

a memory;

a processor communicatively coupled to the memory, wherein the processor comprises:

an instruction processor configured to:

receive an original query for information related to an action affecting a public population;

extract a first semantic query and a second semantic query from the original query, the first semantic query comprising a quantitative action term;

transform, based upon semantic analysis of the quantitative action term, the first semantic query into a numeric model query;

determine semantic response data for the second semantic query based upon semantic analysis of unstructured data sources that comprise unstructured data pertaining to behaviors of the public population to determine response information for the original query;

determine numeric response data for the numeric model query based upon at least one mathematical model incorporating numeric data associated with the public population to determine response information for the original query; and integrate the semantic response data and the numeric response data into an answer for the original query.

10. The system of claim 9, the instruction processor receives the original query from a user as a natural language question.

11. The system of claim 9, the instruction processor further configured to:

extract an additional numeric model query from the original query; and determine additional numeric response data for the additional numeric model query based upon at least one mathematical model incorporating numeric data associated with the public population, wherein the instruction processor is further configured to integrate the additional numeric response data into the answer for the original query.

12. The system of claim 9, wherein the instruction processor is configured to determine numerical response data by being configured to:

identify additional data for the at least one mathematical model to use to respond to the numeric model query;

determine the additional data based upon semantic analysis of the unstructured data sources that comprise unstructured data pertaining to behaviors of the public population; and incorporate the additional data into the at least one mathematical model, wherein the numeric response data is further-based upon the additional data.

13. The system of claim 9, wherein the instruction processor is further configured to:

provide the answer to a user;

determine, subsequent to providing the answer to the user and subsequent to the user taking the action, semantic reaction data based upon semantic analysis of the unstructured data sources that comprise unstructured data pertaining to behaviors of the public population to determine a reaction of the public population to the action;

update, based on the semantic reaction data, at least one of the at least one mathematical model and a model used for semantic analysis of the unstructured data sources.

14. The system of claim 13, wherein the unstructured data sources comprise at least one of at least one blog, at least one letter, and at least one data stream describing behaviors of the public population.

15. A computer program product for responding to a query, the computer program product comprising:

a non-transitory storage device readable by a processing circuit and storing instructions for execution by the processing circuit for performing a method comprising:

receiving an original query for information related to an action affecting a public population;

extracting a first semantic query and a second semantic query from the original query, the first semantic query comprising a quantitative action term; transforming, based upon semantic analysis of the quantitative action term, the first semantic query into a numeric model query;

determining semantic response data for the second semantic query based upon semantic analysis of unstructured data sources that comprise unstructured data pertaining to behaviors of the public population to determine response information for the original query;

determining numeric response data for the numeric model query based upon at least one mathematical model incorporating numeric data associated with the public population to determine response information for the original query; and integrating the semantic response data and the numeric response data into an answer for the original query.

16. The computer program product of claim 15, the method further comprising receiving the original query from a user as a natural language question.

17. The computer program product of claim 15, the method further comprising:

extracting an additional numeric model query from the original query; and determining additional numeric response data for the additional numeric model query based upon at least one mathematical model incorporating numeric data associated with the public population, wherein the integrating further comprising integrating the additional numeric response data into the answer for the original query.

18. The computer program product of claim 15, the method further comprising:

wherein the determining numeric response data comprises:

identifying additional data for the at least one mathematical model to use to respond to the numeric model query;

determining the additional data based upon semantic analysis of the unstructured data sources that comprise unstructured data pertaining to behaviors of the public population; and incorporating the additional data into the at least one mathematical model, wherein the numeric response data is further based upon the at least one mathematical model incorporating the additional data.

19. The computer program product of claim 15, the method further comprising:

providing the answer to a user;

determining, subsequent to providing the answer to the user and subsequent to the user taking the action, semantic reaction data based upon semantic analysis of the unstructured data sources that comprise unstructured data pertaining to behaviors of the public population to determine a reaction of the public population to the action; and updating, based on the semantic reaction data, at least one of the at least one mathematical model and a model used for semantic analysis of the unstructured data sources.

20. The computer program product of claim 19, wherein the unstructured data sources comprise at least one of at least one blog, at least one letter, and at least one data stream describing behaviors of the public population.

* * * * *